Sept. 20, 1971 W. MÜLLER 3,605,302
TRAVELING PLACARD CHARACTER DISPLAY APPARATUS
Filed Aug. 14, 1969 4 Sheets-Sheet 4

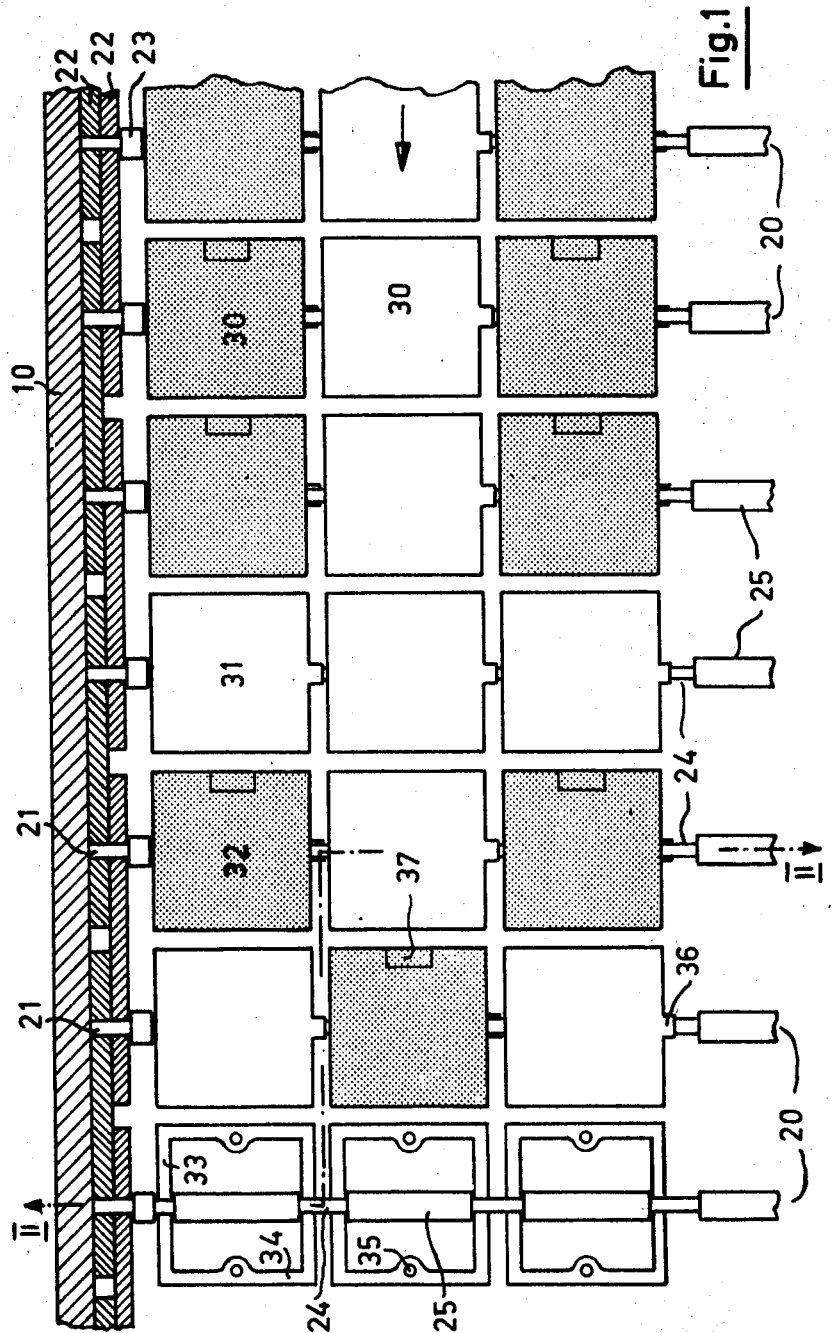

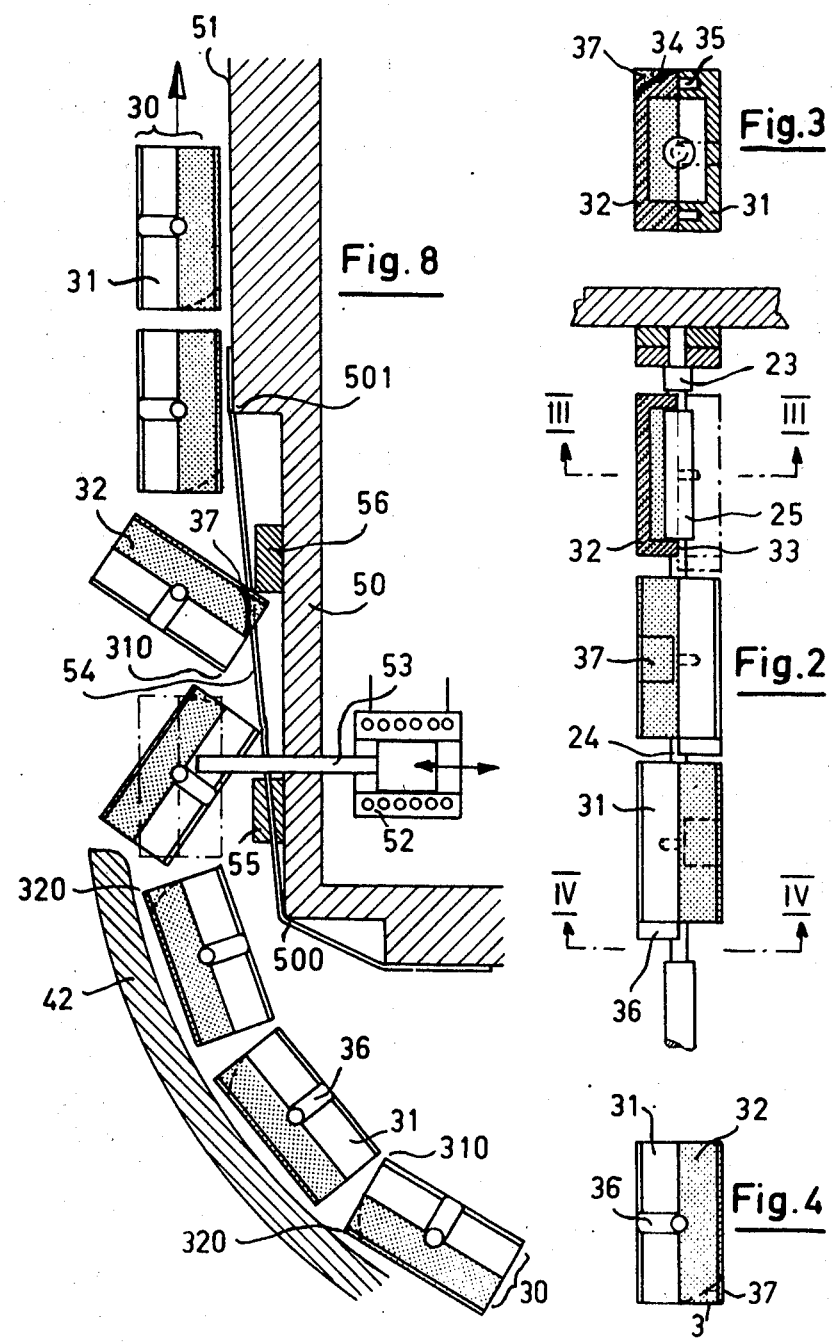

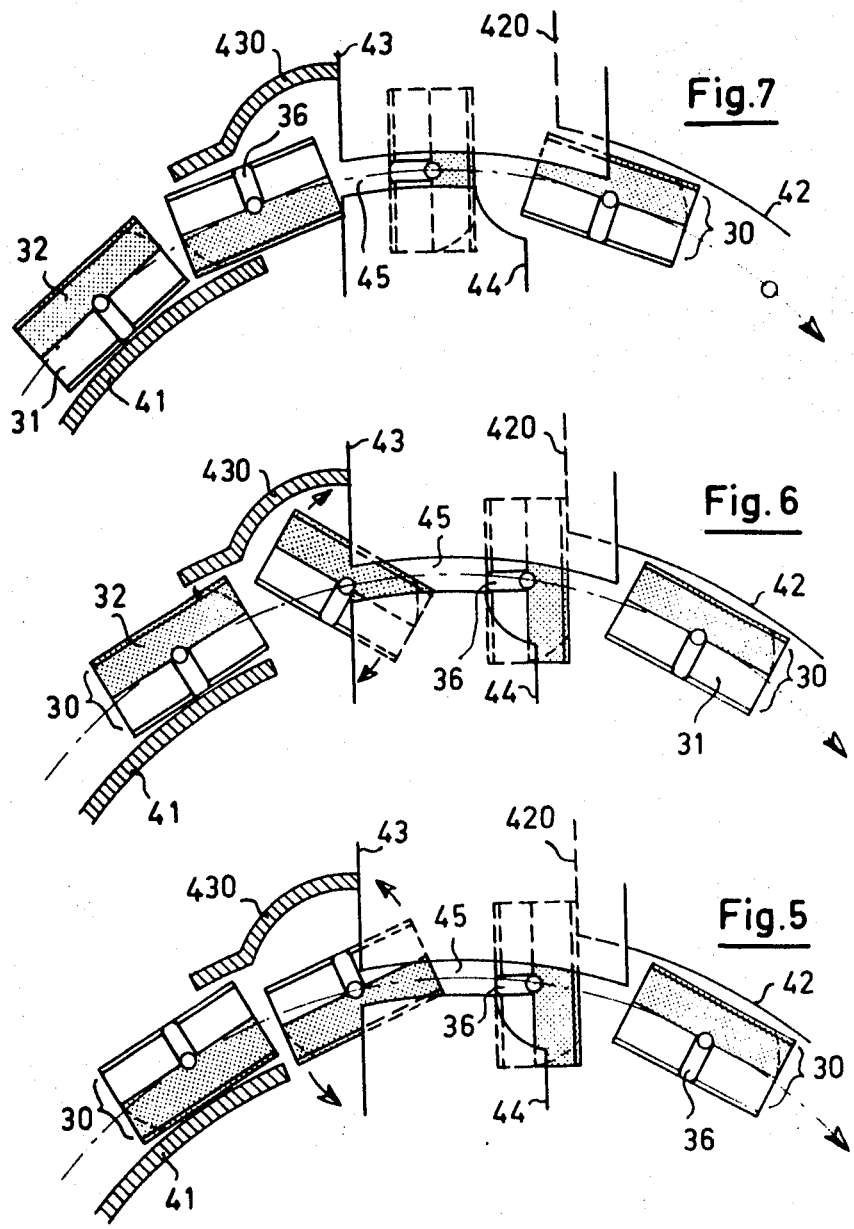

INVENTOR
Werner Müller
ATTORNEY

United States Patent Office 3,605,302
Patented Sept. 20, 1971

3,605,302
TRAVELING PLACARD CHARACTER DISPLAY APPARATUS
Werner Müller, Aarau, Switzerland, assignor to Contraves AG, Zurich, Switzerland
Filed Aug. 14, 1969, Ser. No. 850,170
Claims priority, application Switzerland, Aug. 19, 1968, 12,475/68
Int. Cl. G09f *11/28*
U.S. Cl. 40—32       12 Claims

ABSTRACT OF THE DISCLOSURE

A novel traveling placard character display apparatus is disclosed, the apparatus being of the type wherein a plurality of adjacent columns of dual-faced indicating plates rotatably disposed about respective support shafts are movable over and behind an indicating surface which provides an environment optically contrasting with both faces of the indicating plates. The two faces of each indicating plate are themselves optically contrasting and a predetermined character can be displayed on the indicating surface depending upon which face of the indicating plates in the plurality of columns are disposed toward the indicating surface. Extinguishing means are provided ensuring that each indicating plate is initially oriented such that a given face or side thereof faces the indicating surface. Read-in means then serve to rotate selective ones of the indicating plates so as to alter their orientation.

The indicating plates of the instant invention comprise two molded plastic face portions of optically contrasting color which are inserted together in surrounding relationship about collars formed on the support shafts between peripheral grooves. One of the plastic face portions of each indicating plate is provided with a reversing cam means which extends outwardly transverse both to the axis of the support shaft as well as to the visual face portion and cooperates with both the extinguishing means and the read-in means in a novel fashion so as to aid rotation of the associated indicating plate.

BACKGROUND OF THE INVENTION

The instant invention generally concerns display boards and particularly relates to a new and improved apparatus for effecting a traveling display of placard lettering such as characters, numbers, letters, symbols or the like, which display can be controlled in a free sequence and wherein each of the characters appear as a contrasting total image with respect to the surrounding environment and is composed of partial images uniformly distributed in rows and columns of a grid field.

Devices of this general type are known to the art and, in a particular simple physical construction of the same, such traveling character devices and apparatus comprise an endless, motor-driven link chain which is constrained for travel across an indicating surface and then back behind same. The link chain includes a plurality of parallel support shafts connected at their ends by chain links, each support shaft including a column of indicating plates individually rotatably mounted thereon. Each of the indicating plates possesses two approximately square or quadratic visual surfaces optically contrasting with respect to one another. One visual surface of the indicating plate preferably is black while the other surface is white.

The overall apparatus is constructed such that each of the indicating plates is either rotated under the action of an appropriately controlled read-in device or else is permitted to remain in a predetermined given basic position prior to the arrival of the link chain at the indicating surface whereat a display of a predetermined character in an environment optically contrasting with the indicating plate is undertaken. The read-in device incorporates a column of electromagnetic reversing bolt members which can be displaced into and out of their respective positions so as to rotate the indicating plates. Prior to rotation or displacement of the indicating plates at the region of the read-in device, all of the indicating plates are adjusted or preset with the aid of an extinguishing device into a basic given position in which, for example, their black visual surfaces are always turned toward the outside.

Prior-art traveling placard character apparatus of this general type exhibit considerable limitations serving to impair the practical utilization thereof. For one, the components of such apparatus, and particularly the indicating plates thereof, are not constructed such that these components can be manufactured in accordance with inexpensive mass-production techniques and subsequently quickly assembled together in a simple manner to form a device which can readily be used. Furthermore, the prior-art apparatus of this type has no means to prevent, in a reliable manner the indicating plate from assuming intermediate positions between both of the provided for positions so as to compensate for operational disturbances which might occur by blocking of partially rotated indicating plates when the indicating plates, for example, impact with the narrow edge thereof against a contact or stop surface.

SUMMARY OF THE INVENTION

Accordingly, a need exists in the art for a display board apparatus which effectively eliminates the aforementioned drawbacks of prior-art constructions. It is a primary object of the instant invention to satisfy this need.

A still further, significant object of the instant invention concerns the provision of an improved apparatus for traveling placard characters, such as letters, numbers, symbols or the like, wherein the formation of the individual characters can be undertaken quickly, reliably, and without effecting a disturbance of operation of the entire system.

Further significant objects of the instant invention concern the provision of an improved apparatus for traveling placard characters, which apparatus is relatively simple in construction, economical to manufacture, can be constructed of highly reliably operating yet relatively inexpensive mass-produced components, and which operates in a manner such that undesired blocking or break-down of the system is avoided.

Now, in order to implement these and still further objects of the instant invention which will become more readily apparent as the description proceeds, the traveling-character apparatus of the instant invention, while having an overall similarity to prior-art apparatus as discussed above, departs from the prior-art by a number of novel features. One such feature concerns the construction of the indicating plates in that, in accordance with the invention, each indicating plate is composed of two assembled or interconnected molded plastic face portions which serve to engage about a respective collar formed at an associated support shaft between two peripheral or circumferential grooves. One of the molded plastic face portions carries a reversing cam or dog means disposed along an end thereof which is transverse to the support shaft axis. The reversing cam or dog means extends outwardly from the front surface of the molded plastic portion transverse thereto as well as transverse to the axis of the support shaft. The cam means function as reversing cams and are constructed so as to cooperate with the extinguishing means which rotates the indicating plates into a preset given position as well as with the associated reversing bolt means of the read-in device which selectively rotates the indicating plates from the preset, given position. Specifically, the cooperation is such that the cam means aids in the rotation of the indicating plate associated therewith.

Advantageously, and in accordance with the instant invention, each of the molded plastic face portions which can be insertably assembled with respect to one another to form an indicating plate, is constructed as an approximately square or quadratic plate having wall web means formed along the preiphery of one face thereof and extending transverse to the face. Specifically, two parallel wall web means disposed at opposite parallel sides of the plastic portion have semi-cylindrical grooves at their middle or central region for engaging the grooved, reduced diameter portions of the support shaft about a collar. The other two parallel wall web means of each plastic portion have aligned complementary holes and bolts, respectively, for insertion or connection with the other plastic portion forming the indicating plate.

The extinguishing or erasing device or means which, in a positive fashion, effects a proper positioning or alignment of the indicating plates prior to moving the plate into the region of the read-in device or means, is advantageously constructed so as to provide, in a most convenient and simple fashion, a rocker arm guide means for the reversing cam means of the indicating plates which is disposed in a space between two guide sections in which the indicating plates traveling with the endless link chain cannot rotate upon their respective support shafts. The rocker arm guide means is further disposed at the height of the reversing cam means of each line of indicating plates of a respective column, and, in effect, provides a link or detent guide for the reversing cam means which serves to initially pre-rock or pivot the visual surface formed by the plastic portion of the indicating plate which does not carry any reversing cam means so as to partially rotate the indicating plate. Externally of the reversing cam means-displacement path for each line of indicating plates and prior to the next guide section, an impact surface or stop means is disposed for rocking or pivoting the leading surface of the partially rotated indicating plate towards the relevant side so as to complete the rotation and orientation of the plate into the preset, given position.

The read-in device or means provided is equally as operationally reliable as is the extinguishing means discussed above. A cylindrical deflecting path for the link chain and a flat or planar visual surface path connecting therewith is provided. The read-in device or means is disposed at the transition between the deflecting path and the visual surface path and preferably comprises a column of electromagnetic reversing bolt means displaceable from a rest position towards the outside into the path of movement of the rearwardly directed reversing cam means associated with the line of indicating plates so as to pre-turn or pivot the plates. A tension or traction member means is further associated with each line of indicating plates at the column of reversing bolt means, the tension member means being disposed in the plane of the line of indicating plates and being tensioned from the inside to the outside at an inclination or obliquely to the link chain for cooperation with the indicating plates which are to be rotated out of the preset given position through 180° into a work position. The tension member means serves to rotate those indicating plates which have been insufficiently pre-turned by the relevant reversing bolt means back into the preset, given position, and further serves to rotate those indicating plates which have been sufficiently pre-turned even further by rolling the rounded middle portion of the outer edge thereof upon the tension member whereby the indicating plates are finally further rotated into the desired working position at the time when they move into the visual surface path.

BRIEF DESCRIPTION OF THE DRAWINGS

The invention will be better understood and objects other than those set forth above will become apparent when consideration is given the following detailed description thereof, such description making reference to the annexed drawings, wherein:

FIG. 1 depicts a partial sectional view of a portion of the indicating surfaces of the inventive display board;

FIG. 2 depicts a partial sectional view or the arrangement of FIG. 1 taken along the line II—II thereof;

FIG. 3 depicts a sectional view of the arrangement of FIG. 1 taken along the line III—III of FIG. 2;

FIG. 4 depicts a sectional view taken along the line IV—IV of FIG. 2;

FIGS. 5 through 7, inclusive, depict a preferred embodiment of an extinguishing means or erasing mechanism and further illustrate the operation of such mechanism in different positions or phases;

FIG. 8 depicts a preferred embodiment of a read-in means or mechanism of the instant invention; and, FIG. 9 schematically depicts in fragmentary view and on a reduced scale, a support frame of a reversing location or station for the link chain as well as two profile rail members which serve to support the link chain arrangement.

DESCRIPTION OF THE PREFERRED INVENTIVE EMBODIMENT

Figure 9:
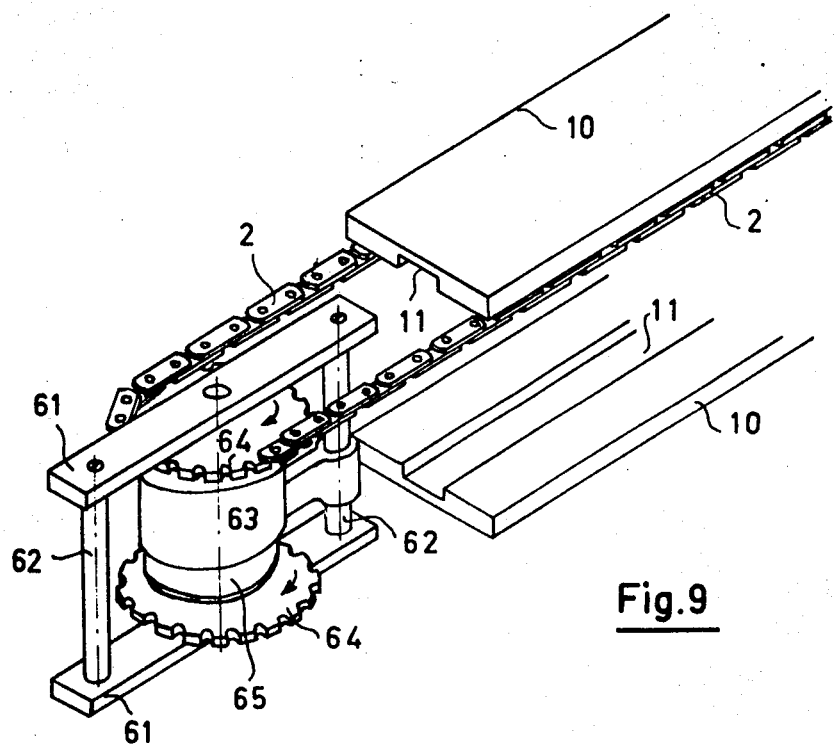

Describing now the drawings, and particularly FIGS. 1 through 4 thereof, it will be seen that the exemplary embodiment of the novel display board invention incorporates an endless motor-driven link chain arrangement which is displaceable relative to a housing of which only a rail 10 thereof has been depicted in the drawings for illustrative convenience. The link chain arrangement further will be seen to incorporate support shaft means 20 upon which indicating plates 30 are rotatably disposed. The ends 21 of the support shaft means 20 are pivotally connected with one another in pairs by means of suitable chain brackets 22 or other equivalent structure, these brackets 22 preferably being constructed of thermoplastic material which possesses good sliding and wear characteristics.

The enlarged portions 23 of the support shafts 20 serve to cooperate with sprocket wheels at the reversing or drive locations of the chain guide arrangement as depicted in FIG. 9. All of the support shafts 20 are further provided with peripheral or circumferential grooves at a uniform spacing from one another for the purpose of forming relatively short shaft sections 24 of reduced cross-section between longer collar portions or collar means 25. The collar means 25 of the support shafts 20 are surrounded by a respective indicating plate 30 in a fashion which will be more fully described hereinbelow. Each indicating plate 30 preferably consists of two approximately square or quadratic plastic molded portions 31 and 32 of which one portion, such as portion 31, has a white visual or exposed face surface and wherein the other portion, such as portion 32 has a black visual or exposed face surface.

A relatively shallow wall web 33 and 34 is provided about the periphery of the plate portions as is illustrated. It will be seen that wall web 33 is arranged transverse to the pivot axis of its corresponding indicating plate and contains semi-cylindrical recesses so as to form bearing tracks or surfaces which engage with the corresponding shaft section or portion 24 having a reduced cross-section. Each of the other wall webs 34 is provided with suitable aligned holes and protruding pins or pegs 35 for the purpose of assembling the square, individual molded plastic portions 31 and 32 into a composite indicating plate assembly. In this fashion, the two plate halves formed by the plastic portions 31 and 32 of an indicating plate can be mounted together while engaging about a collar 25 of the support shaft 20 merely by having the pins of one portion or half engage with the corresponding holes of the other portion or half such that the mounted plate halves 31 and 32 forming the indicating plate are rotatably displaceable upon the associated support shaft 20 yet are not axially displaceable with respect thereto.

It is easily possible to simultaneously fabricate a plurality of plate halves or portions 31 and 32 in a molding device and, through a mutual interconnection by webs, to space such halves at appropriate distances from one another in the arrangement they will assume after they have been mounted upon the support shafts of the link chain. The plate halves 31 and 32 are then assembled together from both sides of the link chain about its support shafts and, after such assembly, the connecting webs can be milled out to separate the individual indicating plates 30 from one another.

The reversing cam means 36 or equivalent structure are disposed at the plate portions 31 having the white visual surfaces at one end surface thereof which is disposed transverse to the axis of its associated support shaft. The reversing cam means are directed outwardly, transverse to the support shaft and towards the plane of the exposed or visual surfaces of the associated plate portion. Additionally, the outer edges of the plate portion or half 32 having a black exposed or visual surface, which edges are oriented parallel to the axis of the associated support shaft, are rounded at their central region 37. In so doing, the rounded surface defines a cylindrical surface having a diameter equal to the length of the plate.

The extinguishing or erasing means as depicted in FIGS. 5 through 7 essentially comprises a guide cylinder 41 for the incoming indicating plates arriving with the chain link arrangement, the indicating plates having either their black or their white visual surfaces turned toward the outside depending upon their previous setting. The indicating plates follow the arcuate path defined by the guide surface 41 and are prevented from rotating thereby. A second external guide cylinder 42 is disposed in spaced relationship from guide cylinder 41 through an intermediate gap, guide cylinder 42 also preventing any appreciable rotation of indicating plates 30 moving therepast which have previously been properly positioned in the extinguishing means formed in the gap.

Additionally, two sheet metal members 43 and 44, or equivalent structure, which collectively form a rocker arm guide means or slot 45, are disposed in the gap or space between both guide cylinders or sections 41 and 42 at the height of the reversing cam means 36 of each line of indicting plates. With this arrangement, it is possible for the reversing cam means 36 of each indicating plate to enter the slot only after the reversing cam means 36 has been rearwardly rocked or pivoted for display in accordance with FIG. 5 or 6. Thus, all of the plate members 30 will pass through the rocker arm guide means or slot 45 in accordance with FIG. 7 in a transverse orientation with respect thereto with the black exposed visual surface of the indicating plate being disposed so as to be leading. After each indicating plate has been initially pre-rocked or pivoted by the rocker arm guide means 45, such plates contact an impact or contact edge or means 420 on guide cylinder 42 which acts upon the leading black exposed surface of each plate 30 in such a fashion that the rotation of the plates is completed such that the plates enter the guide cylinder 42 with the externally disposed black visual surface thereof in the position indicated. A web or bracket 430 is secured to the sheet metal member 43 and serves to bridge the gap between the guide cylinder 41 and the rocker arm slot 45. Thus, at this point, the indicating plates have been preset into a basic, given position such that the black visual surfaces thereof are externally disposed.

The read-in device or means of the instant invention is depicted in FIG. 8 and reference numeral 42 designates the guide cylinder of the same number included within the extinguishing means of FIGS. 5 through 7. From this guide cylinder, all of the indicating plates 30 having their black visual surface externally disposed and having the reversing cam means 36 thereof inwardly directed arrive into the read-in means. An inner guide wall 50 forms a transition between the curved incoming path of the chain link along the guide surface 42 and a flat visual indicating surface 51. A column of electromagnets 52 is disposed behind the guide wall 50, the electromagnets including reversing bolt means 53 displaceable under electrical control from a rest position towards the outside into the path of movement of the rearwardly directed reversing cam means associated with the line of indicating plates, and then back again into the rest position. In accordance with FIG. 8, the reversing bolt means 53 is disposed at the height of the reversing cam means 36 of an associated line of indicating plates 30 and is illustrated in its working position. Between the edges 500 and 501 of the inner guide wall 50, a cable or flexible band 54 is tensioned and defines a tension member means for each line of indicting plates. A stop member means 55 is provided in front of the reversing bolt means 53 and a stop member means 56 is disposed behind the reversing bolt means in the direction of travel of the indicating plates.

Now, an indicating plate 30, upon moving out of the cylindrical deflecting path defined by guide cylinder 42, is partially rotated or pre-turned into its working position by one of the reversing bolt means 53 disposed at the relevant line due to the action of the reversing bolt means 53 upon the inwardly directed reversing bolt means 36. At this time, an edge 310 of the partially rotated indicating plate impacts against the tension cord or cable defining the tension member means 54. The tension member means 54 cooperates with those indicating plates 30 which have been acted upon by the reversing bolt means 53 such that, for example, if the pre-rotation of the indicating plates is insufficient because the reversing bolt means 53 was brought into a working or operable position too late due to poor synchronization or because the relevant plate at the outlet of the guide cylinder 42 was unintentionally rotated somewhat due to a disturbance, then this indicating plate 30 will be driven back into its normal position with the black surface thereof situated towards the outside. Yet, however, if the pre-rotation of the relevant plate member 30 by the reversing bolt means 53 is sufficient, then the edge 310 of the plate presses somewhat against the tension cable 54 and the plate member 30 pivots about such edge 310 while the edge adheres to the cable. Thereafter, the rounded central portion or region 37 of the outer edge 320 of each plate rolls upon the cable 54 and, with the aid of the stop member means 56, such relevant indicating plate 30 is positively rotated further until such rotation reaches a full 180°. At this point, the relevant indicating plate 30 arrives with its externally disposed white visual surface directed away from the indicating surface 51 at which point the indicating plate is again guided. The stop member means 55 disposed in front of the reversing bolt means 53 serves to limit the prerotational movements of the indicating plates 30 under the action of the reversing bolt means 53.

Referring now to FIG. 9, a frame member is illustrated which frame members consists of two lengthwise struts 61 and two transverse struts 62. The frame member can be connected as a unit, for example, by means of a screw connection or with the aid of spring tension, with the housing of the apparatus merely by ineserting its lengthwise strut 61 into appropriate configured guide grooves 11 of the lengthwise support 10 of the entire apparatus. A respective sprocket wheel 64 for meshing with the collars 23 of shaft members 20 of the link chain arrangement 2 is disposed both above and below a motor support 63 along the central axis serving to connect the lengthwise support struts 61 of the frame unit. Only the connecting brackets of the shafts 20 have been illustrated in FIG. 9 so as to preserve illustrative clarity.

The frame unit also is seen to include a drive motor 65 for the link chain arrangement 2 and the drive wheels or sprocket gears 64 of the chain arrangement 2 are disposed upon the rotor or power take-off shaft thereof. The motor dimensions are such that no portion of the motor protrudes past the wheels 64. As mentioned above, a support 63 connected to the frame unit is provided for fixedly mounting the motor between the sprocket wheel pair 64. A second frame unit is disposed at the other side of the apparatus and includes a reversing wheel pair which are freely rotatable at such location upon a support shaft fixedly seated in the frame. The second frame unit preferably does not include a motor.

Advantageously, the read-in means in accordance with FIG. 8 and the extinguishing means in accordance with FIGS. 5 through 7 are mounted upon one of the support frames 61 or 62.

As should now be apparent, the objects initially set forth at the outset of this specification have been successfully achieved.

What is claimed is:

1. In a traveling placard character apparatus of the type wherein a plurality of parallel support shafts are connected at their ends to endless motor driven link chain means, each of the support shafts rotatably supporting a respective column of indicating plates, each of the indicating plates exhibiting two approximately quadratic optically contrasting visual surfaces, wherein the chain, the support shafts, and the respective columns of indicating plates are movable over and behind an indicating surface providing an environment optically contrasting with the indicating plates for displaying a predetermined character, wherein an extinguishing means is provided for initially presetting the indicating platee into a given position, and wherein, a read-in means encompassing a column of electromagnetically displaceable reversing bolt means which can be brought in and out of working position is provided for selectively rotating the indicating plates or retaining the indicating plates in the given position to thereby form the predetermined character, the improvement comprising: a plurality of peripheral grooves disposed about each parallel support shaft forming respective larger size collars between each two peripheral grooves on each shaft; each indicating plate comprising two separate, detachable yet releasably interconnected molded plastic face portions inserted together in surrounding relationship about a respective collar on a parallel support shaft so as to be freely rotatable on said parallel support shaft yet non-axially displaceable thereon; a reversing cam means carried by one of said molded plastic portions along an end thereof which is disposed transverse to the support shaft axis, each said one plastic portion of each indicating plate possessing the same type of visual surface, said reversing cam means extending transverse to the support shaft axis and to the face surface of said one molded plastic portion, said reversing cam means being constructed to cooperate with both said extinguishing means as well as with the associated reversing bolt means of said read-in device so as to effect rotation of the indicating plate.

2. In a traveling placard character apparatus of the type wherein a plurality of parallel support shafts are connected at their ends to endless motor driven link chain means, each of the support shafts rotatably supporting a respective column of indicating plates, each of the indicating plates exhibiting two approximately quadratic optically contrasting visual surfaces, wherein the chain, the support shafts, and the respective columns of indicating plates are movable over and behind an indicating surface providing an environment optically contrasting with the indicating plates for displaying a predetermined character, wherein an extinguishing means is provided for initially presetting the indicating plates into a given position, and wherein, a read-in means encompassing a column of electromagnetically displaceable reversing bolt means which can be brought in and out of working position is provided for selectively rotating the indicating plates or retaining the indicating plates in the given position to thereby form the predetermined character, the improvement comprising: a plurality of peripheral grooves disposed about each parallel support shaft forming respective collars between each two peripheral grooves on each shaft; each indicating plate comprising two molded plastic face portions inserted together in surrounding relationship about a respective collar on a parallel support shaft; a reversing cam means carried by one of said molded plastic portions along an end thereof which is disposed transverse to the support shaft axis, each said one plastic portion of each indicating plate possessing the same type of visual surface, said reversing cam means extending transverse to the support shaft axis and to the face surface of said one molded plastic portion, said reversing cam means being constructed to cooperate with said extinguishing means as well as with the associated reversing bolt means of said read-in device so as to effect rotation of the indicating plate, each of said molded plastic portions of said indicating plate being constructed as an approximately quadratic plate having wall web means formed along the periphery of one face thereof and extending transverse to said face, wherein two parallel wall web means disposed at opposite parallel sides of each plastic portion have semi-cylindrical grooves at their central region for engaging said grooved, reduced diameter portions of said support shaft about a collar, and wherein the other two parallel wall web means of each plastic portion have means for connection with the other plastic portion of said indicating plate.

3. The improvement defined in claim 2, wherein said extinguishing means comprises a cam guide means for said reversing cam means disposed in a space between two guide sections in which said indicating plates traveling with said endless link chain means cannot rotate upon said support shaft, said cam guide means being at the height of said reversing cam means of each line of indicating plates of a respective column, said cam guide means operatively engaging with said reversing cam means of each indicating plate to initially pivot that visual surface thereof formed by said plastic face portion of said plate which does not carry any reversing cam means to partially rotate said indicating plate such that said last-mentioned visual surface faces forwards with regard to the direction of movement of said indicating plate, and wherein, outside of the reversing cam-movement path of each line of indicating plates and before the next guide section, an impact surface means is disposed for rocking the leading surface of said partially rotated indicating plate towards the relevant side to complete the rotation and presetting thereof into the given position.

4. The improvement defined in claim 2, wherein the outer edge, which lies parallel to the axis of said support shaft, of said plastic molded portion which does not carry said reversing cam means is at least rounded over the middle portion of its length.

5. The improvement defined in claim 4, wherein a cylindrical deflecting path for the link chain means and a flat visual surface path connecting therewith is provided, and wherein a read-in device is provided at the transition between said deflecting path and said visual surface path, said read-in device comprising: a column of electromagnetic reversing bolt means displaceable from a rest position towards the outside into the path of movement of the rearwardly directed reversing cam means associated with the line of said indicating plates to pre-turn the plates; a tension member means associated with each line of indicating plates at said column of reversing bolt means, said tension member means being disposed in the plate of the line and being tensioned from the inside towards the outside at an inclination to the link chain means for cooperation with the indicating plates which are to be rotated out of the preset, given position through 180° into a work position, said tension member means rotating those indicating plates which have been insufficiently pre-turned by the relevant reversing bolt means back into the preset, given position, and rotating sufficiently pre-turned indicating plates further by rolling the rounded middle portion of said outer edge thereof upon said tension member means, whereby said indicating plates are finally further rotated into the desired working position at the time when they move into said visual surface path.

6. The improvement defined in claim 5, wherein, after said reversing bolt means, a stop member is disposed for each line of indicating plates for effecting positive further rotation of the indicating plates which are rolling via the rounded edge thereof upon the tension member means such that said indicating plates assume said desired working position.

7. The improvement defined in claim 2, further including reversing wheel-and drive wheel pairs for the endless link chain means, said wheel pairs being mounted in a frame having struts extending in the lengthwise direction of said link chain means; supports for said apparatus extending in the lengthwise direction of said link chain means, said supports having guide grooves; and wherein said struts are oriented with respect to the common wheel axis so as to be displaceable for insertion in said guide grooves of said lengthwise extending supports for the apparatus.

8. The improvement as defined in claim 7, further including a drive motor, said wheel pair for driving the link chain means being rigidly connected for rotation in said frame upon the power take-off shaft of said drive motor, said drive motor being fixedly mounted between said wheel pair, and wherein a further reversing wheel pair is mounted upon a support shaft fixed in a second frame.

9. The improvement as defined in claim 7, wherein the extinguishing means and the read-in device of the apparatus are mounted upon said frame.

10. A display apparatus comprising: a plurality of rotatable indicating plates, each plate having surrounding end walls and two optically contrasting side wall surfaces formed as two separate, detachable yet releasably interconnected plastic face portions defining respective visual surfaces, cam means disposed on one end wall of a given one of said two plastic face portions, said cam means extending transverse to said side wall surfaces, and indicating surface means; drive means for moving said indicating plates over and behind said indicating surface means such that one of said side wall surfaces is disposed parallel to and facing said indicating surface means; extinguishing means disposed before said indicating surface means in the direction of travel of said indicating plates for rotating said indicating plates such that the same side surface of each of the plates initially faces in the same given direction, said extinguishing means including a cam guide channel cooperating with said cam means on each of said indicating plates, said cam guide channel being located at the height of said reversing cam means of each line of indicating plates of a respective column, said cam guide channel operatively engaging with said reversing cam means of each indicating plate to initially pivot such indicating plate through an angle of about 90° such that the visual surface formed by said plastic face portion of said plate which does not carry any reversing cam means faces forwards in the direction of movement of said indicating plate, and wherein, outside of the reversing cam-movement path of each line of indicating plates there is disposed an impact surface means for rocking the leading surface of said partially rotated indicating plate towards the relevant side to complete the rotation and presetting thereof into the given position; and read-in means disposed between said extinguishing means and said indicating surface means for rotating selective ones of said indicating plates from a given orientation established by said extinguishing means into an orientation wherein the other side surface thereof faces said given direction, whereby characters are selectively formed at the region of said indicating surface means.

11. Apparatus as defined in claim 10, wherein said read-in means comprises electromagnetic bolts cooperable with said cam means of each indicating plate to effect rotation thereof.

12. A display apparatus comprising: a plurality of rotatable indicating plates, each plate having surrounding end walls and two optically contrasting side wall surfaces, cam means disposed on one end wall, said cam means extending transverse to said side wall surfaces, an indicating surface means; drive means for moving said indicating plates over and behind said indicating surface means such that one of said side wall surfaces is disposed parallel to and facing said indicating surface means; extinguishing means disposed before said indicating surface means in the direction of travel of said indicating plates for rotating said indicating plates such that the same side surface of each of the plates initially faces in the same given direction, said extinguishing means including a cam guide channel cooperating with said cam means on each of said indicating plates; and read-in means disposed between said extinguishing means and said indicating surface means for rotating selective ones of said indicating plates from a given orientation established by said extinguishing means into an orientation wherein the other side surface thereof faces said given direction, whereby characters are selectively formed at the region of said indicating surface means, said read-in means further including tensioned cord means and stop block means disposed at the region of said direction of travel of said indicating plates, and wherein said electromagnetic bolts initiate the rotation of said indicating plates, said rotation being selectively continued or reversed by said tensioned cord means depending upon the amount of initial rotation, and being completed by said stop block means, such that said selective ones of said indicating plates are normally rotated through an angle of 180° into a work position.

References Cited

UNITED STATES PATENTS

| | | | |
|---|---|---|---|
| 1,765,215 | 6/1930 | Duchard | 40—28L |
| 3,267,595 | 8/1966 | Levy et al. | 40—28L |

ROBERT W. MICHELL, Primary Examiner

R. P. DYER, Assistant Examiner

U.S. Cl. X.R.

40—28C, 97